(12) United States Patent
Howard et al.

(10) Patent No.: US 12,496,257 B2
(45) Date of Patent: Dec. 16, 2025

(54) INGREDIENT DISPENSING AND DRINK THROUGH DEVICE FOR BEVERAGE CONTAINER

(71) Applicant: Dispensa Holdings LLC, Carlsbad, CA (US)

(72) Inventors: Daniel Howard, Oceanside, CA (US); Mario Junior Irizarry, Murrieta, CA (US)

(73) Assignee: Dispensa Holdings LLC, Carlsbad, CA (US)

( * ) Notice: Subject to any disclaimer, the term of this patent is extended or adjusted under 35 U.S.C. 154(b) by 0 days.

(21) Appl. No.: 18/693,402

(22) PCT Filed: Sep. 19, 2022

(86) PCT No.: PCT/US2022/076649
§ 371 (c)(1),
(2) Date: Mar. 19, 2024

(87) PCT Pub. No.: WO2023/049676
PCT Pub. Date: Mar. 30, 2023

(65) Prior Publication Data
US 2024/0277575 A1    Aug. 22, 2024

Related U.S. Application Data

(60) Provisional application No. 63/246,644, filed on Sep. 21, 2021.

(51) Int. Cl.
*A61J 1/20* (2006.01)
*A47J 31/40* (2006.01)
*A61J 11/00* (2006.01)

(52) U.S. Cl.
CPC .......... *A61J 1/2093* (2013.01); *A47J 31/407* (2013.01); *A61J 11/0075* (2013.01)

(58) Field of Classification Search
CPC .......................... B65D 51/2814; B65D 51/28; B65D 51/2807; B65D 51/2821; B65D 81/3255;
(Continued)

(56) References Cited

U.S. PATENT DOCUMENTS 6,003,728 A    12/1999 Elliott
7,828,140 B2   11/2010 Lee et al.
(Continued)

FOREIGN PATENT DOCUMENTS

CN    101687572    3/2010
CN    102803086    11/2012
(Continued)

OTHER PUBLICATIONS

International Search Report and Written Opinion received International Application No. PCT/US2022/076649 dated Jan. 19, 2023.

*Primary Examiner* — Steven A. Reynolds
(74) *Attorney, Agent, or Firm* — Knobbe, Martens, Olson & Bear, LLP

(57) ABSTRACT

A beverage ingredient mixing and dispensing assembly can include an adapter configured for attachment to a beverage container and can include a beverage ingredient receptacle having a piercing assembly configured to pierce a frangible seal of a beverage ingredient cartridge. The piercing assembly can pierce the seal and allow a beverage ingredient from within the cartridge to pass into the beverage container for mixing with a liquid and thereby forming a mixed beverage. The beverage ingredient receptacle can be removable. A plurality of different seized beverage ingredient receptacles can be removably attached to the adapter. A retainer member can be placed over a top end of a beverage ingredient cartridge positioned in the beverage ingredient receptacle.

11 Claims, 12 Drawing Sheets

(58) Field of Classification Search
CPC .... B65D 81/32; B65D 81/3238; A61J 1/2093; A47J 31/407
USPC .................................................. 206/219, 222
See application file for complete search history.

(56) References Cited

U.S. PATENT DOCUMENTS

| | | | |
|---|---|---|---|
| 8,230,777 | B2 | 7/2012 | Anson et al. |
| 8,701,906 | B1* | 4/2014 | Anderson ............... B65D 41/20 |
| | | | 215/DIG. 8 |
| 8,839,982 | B1* | 9/2014 | Anderson ........... B65D 51/2835 |
| | | | 220/267 |
| 9,242,773 | B1 | 1/2016 | Anderson |
| 10,189,617 | B2 | 1/2019 | Irizarry et al. |
| 11,203,472 | B2 | 12/2021 | Irizarry et al. |
| 2002/0184857 | A1* | 12/2002 | O'Connor ............. B65B 61/182 |
| | | | 53/412 |
| 2005/0127101 | A1 | 6/2005 | Roth et al. |
| 2008/0202950 | A1* | 8/2008 | Anderson ........... B65D 51/2842 |
| | | | 215/11.1 |
| 2008/0202951 | A1 | 8/2008 | Landolt et al. |
| 2009/0255897 | A1 | 10/2009 | Buczkowski |
| 2010/0258457 | A1* | 10/2010 | Seelhofer ........... B65D 51/2821 |
| | | | 206/222 |
| 2013/0025466 | A1* | 1/2013 | Fu ........................ B65D 65/466 |
| | | | 99/295 |
| 2015/0166239 | A1* | 6/2015 | Dabah .................... B65D 51/28 |
| | | | 206/222 |
| 2015/0203260 | A1 | 7/2015 | Kim et al. |
| 2015/0282654 | A1 | 10/2015 | Kurabe et al. |
| 2016/0167852 | A1* | 6/2016 | Moradi .................. B65D 47/06 |
| | | | 215/227 |
| 2017/0183149 | A1 | 6/2017 | Aponte et al. |
| 2019/0039793 | A1 | 2/2019 | Irizarry et al. |

FOREIGN PATENT DOCUMENTS

| | | |
|---|---|---|
| CN | 101061041 | 10/2017 |
| EP | 1712486 A1 | 10/2006 |
| EP | 2311748 A1 | 4/2011 |
| KR | 20130128753 | 11/2013 |
| WO | WO 03/013962 | 2/2003 |
| WO | WO 2006/020059 A2 | 2/2006 |
| WO | WO 2011/098865 A1 | 8/2008 |
| WO | WO 2008/104854 A2 | 9/2008 |
| WO | WO 2010/131938 A2 | 11/2010 |
| WO | WO 2018/119158 A1 | 6/2018 |
| WO | WO 2023/049676 A1 | 3/2023 |

* cited by examiner

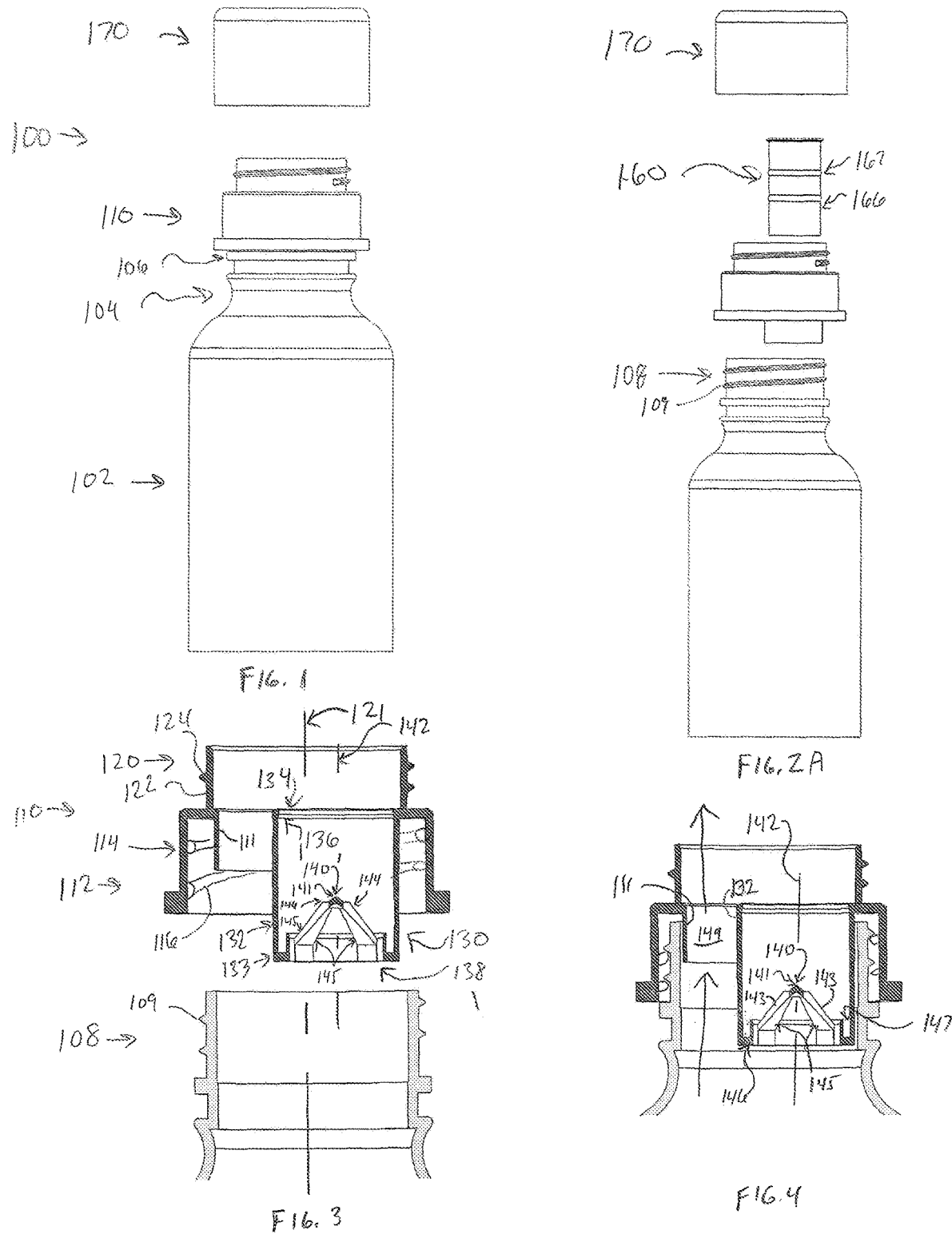

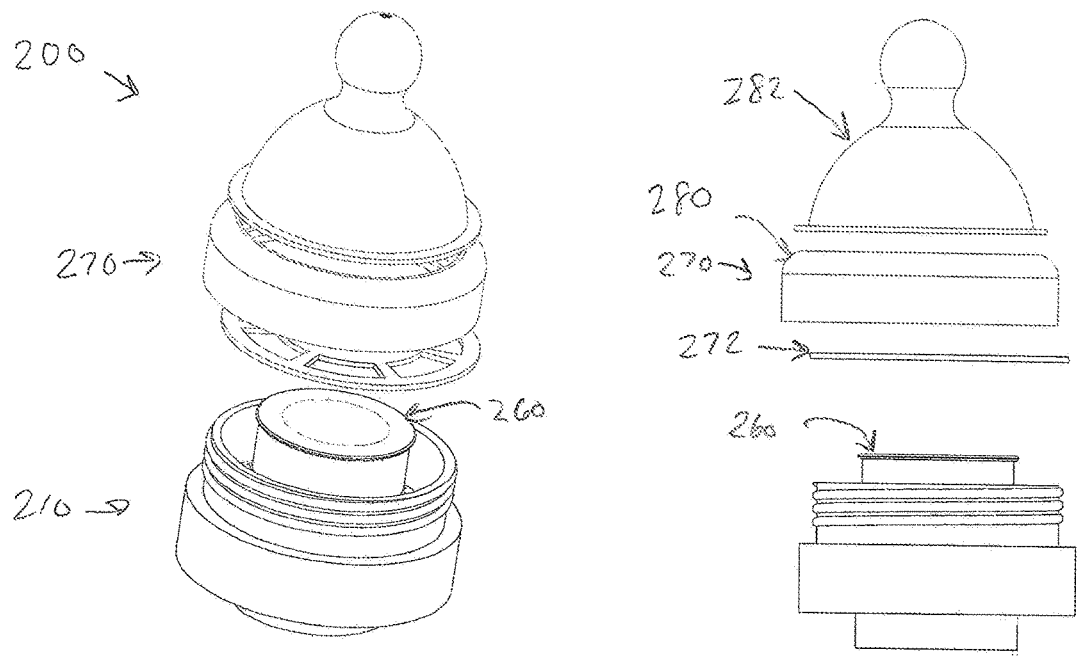
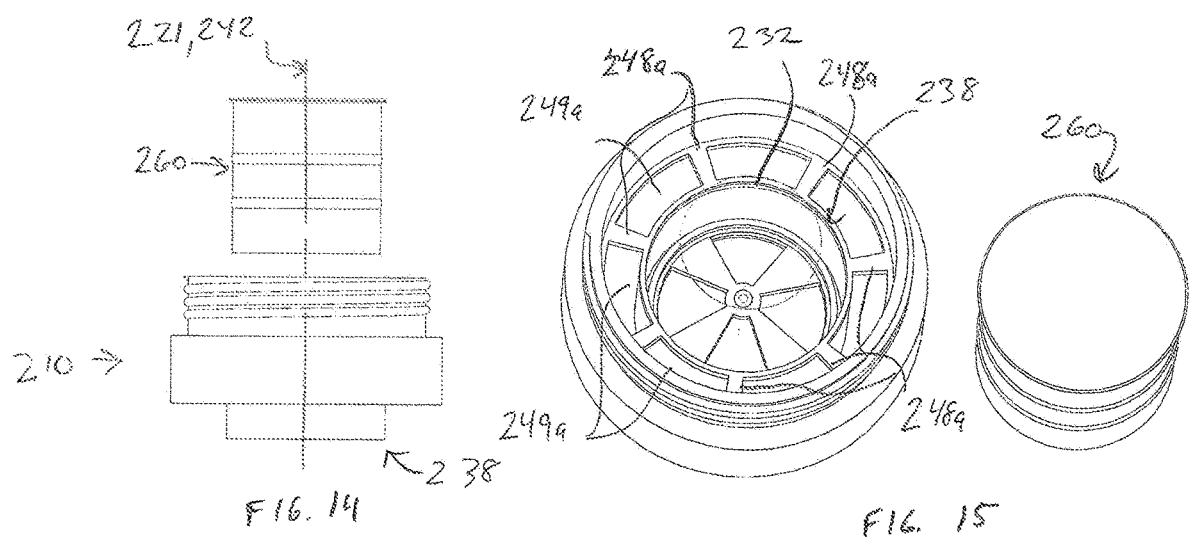

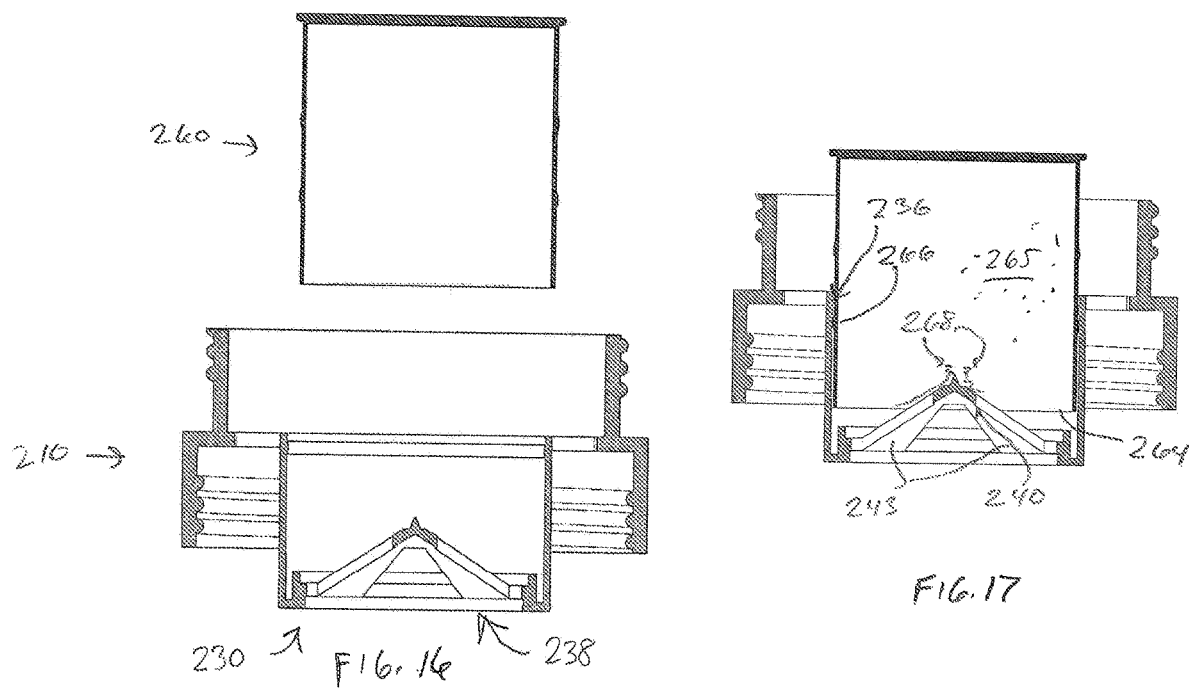
FIG. 16
FIG. 17
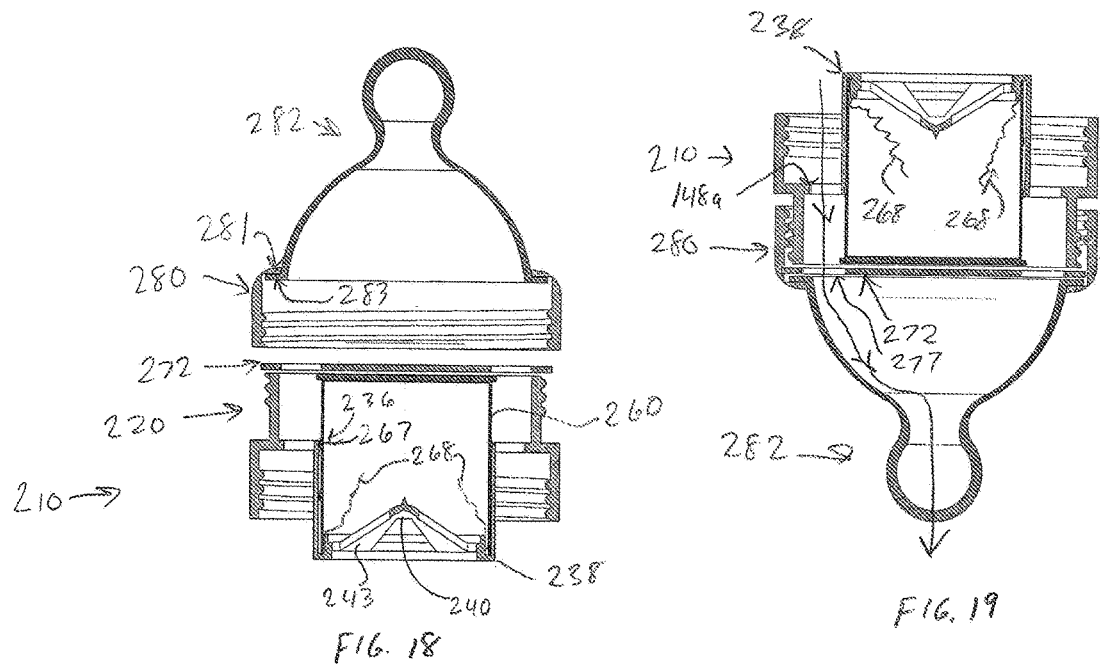
FIG. 18
FIG. 19

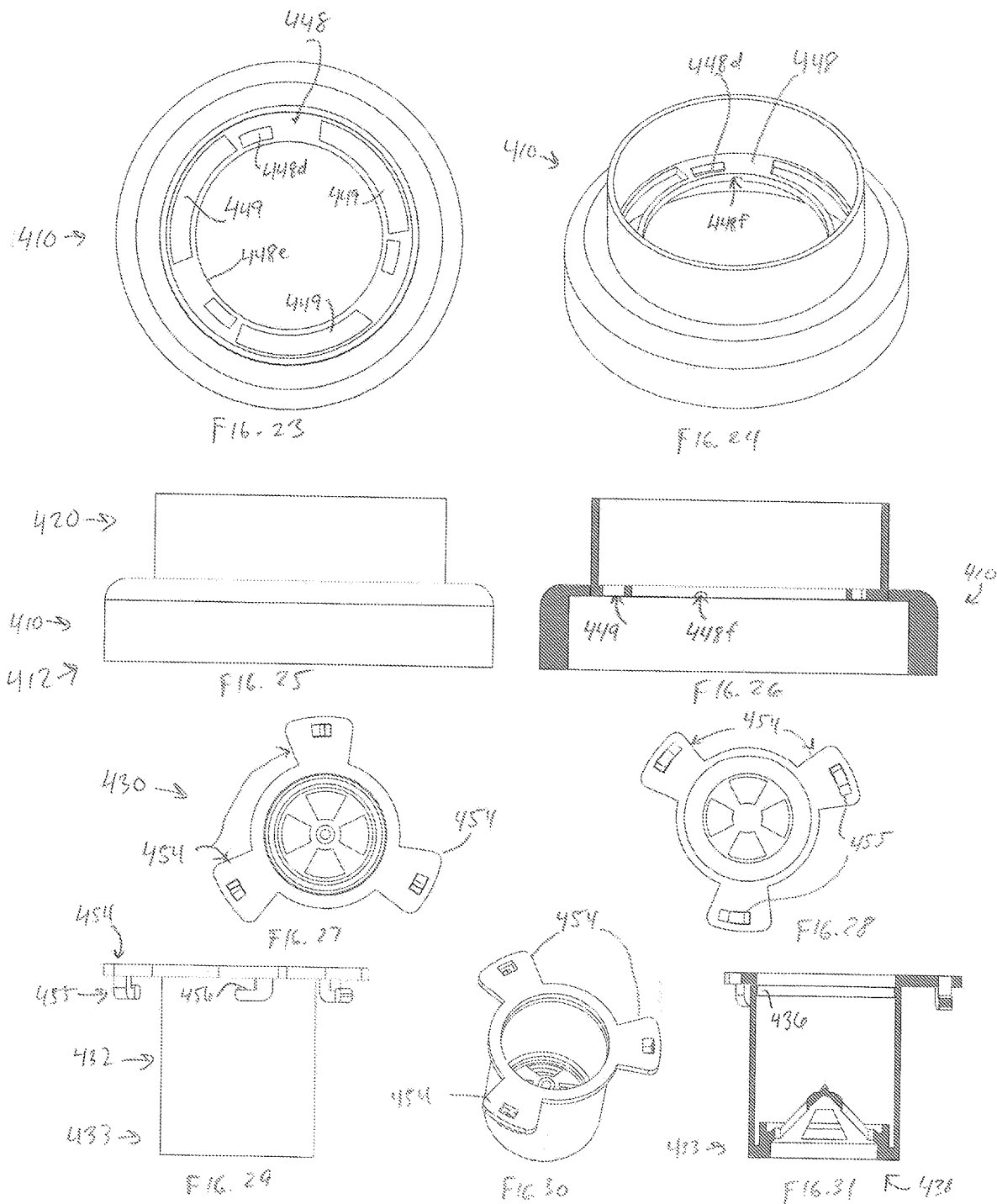

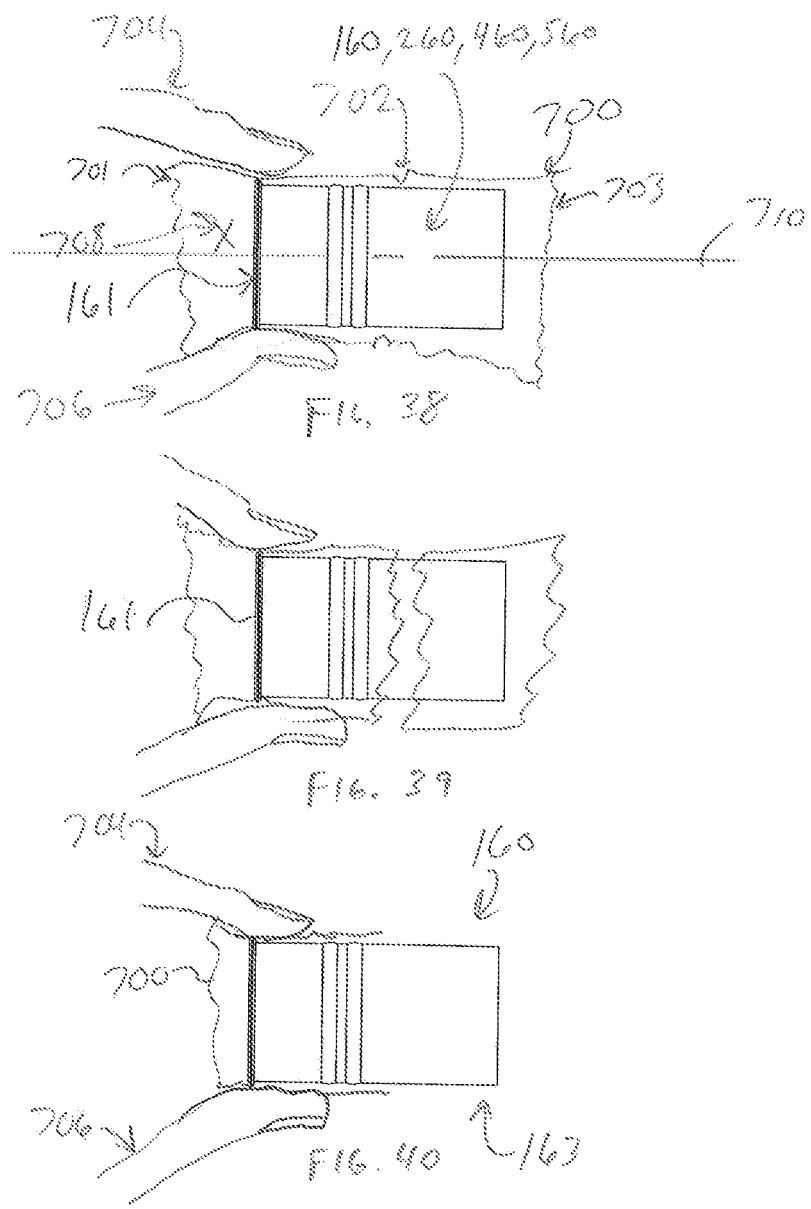

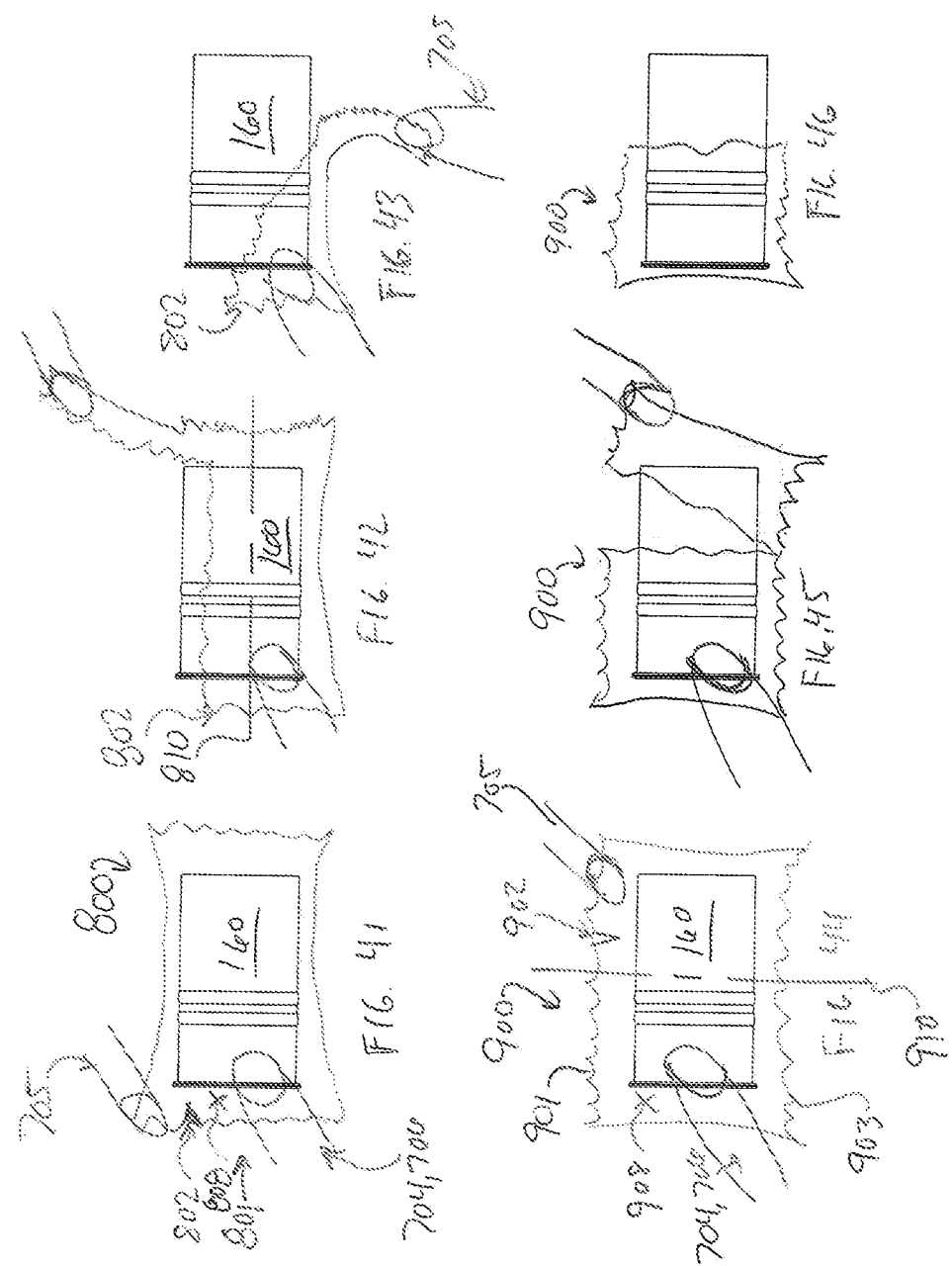

INGREDIENT DISPENSING AND DRINK THROUGH DEVICE FOR BEVERAGE CONTAINER

CROSS REFERENCE TO RELATED APPLICATIONS

This application is a U.S. national stage application of International Patent Application No. PCT/US2022/076649, filed Sep. 19, 2022 and published as WO 2023/049676 A1, which claims priority to U.S. Provisional Patent Application No. 63/246,644, filed Sep. 21, 2021, the contents of which are each incorporated by reference herein in their entirety.

BACKGROUND OF THE INVENTIONS

Field of the Inventions

The inventions disclosed herein relate to beverage mixing and dispensing devices for example, beverage containers that enable users to inject an ingredient into a beverage container, mix the ingredients, and drink the resulting beverage mixture therefrom.

Description of the Related Art

Presently, there are tens of thousands of beverage products widely available to the consuming public. The vast majority, if not all, of these beverages are made by mixing dry or concentrated ingredients with water, then distributing the mixed beverages to retail locations in plastic bottles.

Many retailers normally cannot sell all of the different beverages and waters currently offered by beverage manufacturers. For example, the practical reality of the large amount of shelf space required for selling prepared liquid beverages effectively limits the number of different beverages many retailers can offer for sale at any one time. Thus, most retailers must choose a subset of the many beverages that are available to sell in their establishment.

Recently, beverage ingredient dispensing devices have become available. Such dispensing devices might include a reservoir containing dried beverage ingredients with a frangible foil temporarily sealing the dry beverage ingredient in the device. Various devices are provided for puncturing the seal and mixing the beverage ingredient with a liquid for later consumption. In some such devices, the beverage ingredient cartridges pierced at its lower end and at its upper end such that after the beverage ingredient is mixed with a liquid such as water, the user can drink the mixed beverage with a beverage dispenser mouthpiece such that the mixed beverage flows through the cartridge.

In other designs, the beverage ingredient cartridge is inserted into a cartridge chamber and pierced at its lower end, and then a lid is closed over the top of the beverage ingredient cartridge. The beverages ingredient is then mixed with water to form a mixed beverage and then the beverage is dispensed through a separate drinking spout disposed adjacent to the cartridge receptacle.

SUMMARY OF THE INVENTIONS

An aspect of at least one of the inventions disclosed here and includes a realization that a system that includes a beverage ingredient cartridge is more difficult to manufacture where the mixed beverage is eventually dispensed through the cartridge, i.e., from the beverage container, upwards through the lower end of the cartridge, then out of the container through the upper end of the cartridge. For example, such a design requires the cartridge to be pierced at both ends and a drinking spout arrangement that can receive fluid flowing through the cartridge. Additionally, other designs, such as those noted above, in which the cartridge receptacle is disposed adjacent to a drinking spout, requires additional space on the top of the beverage container and thus can require a large top of the beverage container to fit both the receptacle and the drinking port.

Thus, an aspect of at least one of the inventions disclosed here and includes the realization that a beverage mixing assembly can include a cartridge receptacle and openings which allow mixed beverage from the interior of the beverage container to flow upwardly and around the cartridge receptacle, in use, for example, during drinking, and outwardly through a drinking port. In such an arrangement, the drinking port can be positioned closer to, partly overlap, or can be generally aligned with the cartridge receptacle and thus reduce the amount of space required on the top of the assembly for the cartridge receptacle and the drinking port. This can also and further simplify the assembly so that additional seals are not required for piercing the top end of the cartridge and for creating seals with the drinking port.

In one aspect, a beverage mixing and dispensing assembly kit includes a liquid container, at least a first beverage ingredient cartridge, at least a second beverage ingredient cartridge, an adapter member, a lid member, and a retainer member. The liquid container can have a reservoir portion and an upper mouth portion. The upper mouth portion can comprise an external threaded portion configured for threaded engagement. The at least first beverage ingredient cartridge can include a first cartridge housing with a first upper end that is closed, a first lower end with a first opening defining a first ingredient discharge passage, a first frangible seal member sealed over the ingredient discharge passage, and a first beverage ingredient contained within the first cartridge housing by the first frangible seal member. The at least second beverage ingredient cartridge can include a second cartridge housing with a second upper end that is closed, a second lower end with a second opening defining a second ingredient discharge passage, a second frangible seal member sealed over the second ingredient discharge passage, and a second beverage ingredient contained within the second cartridge housing by the second frangible seal member. The adapter can include a lower end portion, an upper mouth portion, a first removable beverage ingredient receptacle portion, a second removable beverage ingredient cartridge receptacle portion, and a mounting flange. The lower end portion can include adapter internal threads configured to engage with the external threaded portion of the liquid container. The upper mouth portion can include adapter external threads. The first beverage ingredient cartridge receptacle portion can include a first receptacle wall portion sized to receive the first cartridge housing, a first upper end with a plurality of first struts extending from the first upper end and each having a first hook portion, and a first piercing member configured to pierce the first frangible seal member when the first beverage ingredient cartridge is inserted into the first beverage ingredient cartridge receptacle portion, in use. The second beverage ingredient cartridge receptacle portion can include a second receptacle wall portion sized to receive the second cartridge housing, a second upper end with a plurality of second struts extending from the second upper end and each having a second hook portion, and a second piercing member configured to pierce the second frangible seal member when the second beverage ingredient cartridge is inserted into the second beverage ingredient cartridge receptacle portion, in use. The mounting flange can be configured to releasably connect with the first and second removable beverage ingredient cartridge receptacle portions, the mounting flange comprising a least a plurality of locking apertures configured to receive the first and second hook portions and at least a plurality of liquid flow passages configured to allow liquid to flow from the lower end portion, through the plurality of liquid flow passages and out through the upper mouth portion. The lid member can be configured to engage the upper mouth portion of the adapter member. The retainer member can be disposed between the adapter member and the lid member and configured to retain the first cartridge in the first removable beverage ingredient cartridge receptacle portion and to retain the second cartridge in the second removable beverage ingredient cartridge receptacle portion, in use. The retainer member can include a peripheral portion, a cartridge blocking portion, and a fluid passage portion disposed between the peripheral portion and the cartridge blocking portion, the peripheral portion being sized to fit between and be secured in place by the adapter member and the lid member, the cartridge blocking portion being without any apertures large enough for either of the first or second beverage ingredient cartridges to pass through, the fluid passage portion comprising one or more apertures configured to allow a mixed beverage from the liquid container to pass therethrough.

Various embodiments of the various aspects may be implemented. In some embodiments, the lid member comprises a ring member and a baby bottle nipple. In some embodiments, the lid member comprises a closeable drinking port. In some embodiments, the first beverage ingredient cartridge is sealed in a sterile wrapper, the sterile wrapper comprising a first longitudinal end and a second longitudinal end, the first upper end of the first beverage ingredient cartridge being positioned at the first longitudinal end of the sterile wrapper, an exterior surface of the first longitudinal end of the sterile wrapper comprising an indicia indicating a position of the first upper end of the beverage ingredient cartridge, the sterile wrapper comprising a notch disposed between the first and second longitudinal ends, the notch being configured to facilitate tearing of the sterile wrapper along a tearing direction transverse to a longitudinal direction of the sterile wrapper.

In another aspect, a beverage mixing and dispensing assembly kit includes a liquid container, a first beverage ingredient cartridge, an adapter member, and a lid member. The liquid container can include a reservoir portion and an upper mouth portion, the upper mouth portion comprising an external threaded portion configured for threaded engagement. The first beverage ingredient cartridge can include a first cartridge housing with a first upper end that is closed, a first lower end with a first opening defining a first ingredient discharge passage, a first frangible seal member sealed over the ingredient discharge passage, and a first beverage ingredient contained within the first cartridge housing by the first frangible seal member. The adapter member can include a lower end portion, an upper mouth portion, a first removable beverage ingredient cartridge receptacle portion, and a mounting flange. The lower end portion can include adapter internal threads configured to engage with the external threaded portion of the liquid container. The upper mouth portion can include adapter external threads. The first beverage ingredient cartridge receptacle portion can include a first receptacle wall portion sized to receive the first cartridge housing, and a first piercing member configured to pierce the first frangible seal member when the first beverage ingredient cartridge is inserted into the first beverage ingredient cartridge receptacle portion, in use. The mounting flange can be configured to releasably connect with the first removable beverage ingredient cartridge receptacle portion. The mounting flange can include at least a plurality of liquid flow passages configured to allow liquid to flow from the lower end portion, through the plurality of liquid flow passages and out through the upper mouth portion. The lid member configured to engage the upper mouth portion of the adapter member.

Various embodiments of the various aspects may be implemented. In some embodiments, the lid member comprises a ring member and a baby bottle nipple. In some embodiments, the lid member comprises a closeable drinking port. In some embodiments, the first beverage ingredient cartridge is sealed in a sterile wrapper, the sterile wrapper comprising a first longitudinal end and a second longitudinal end, the first upper end of the first beverage ingredient cartridge being positioned at the first longitudinal end of the sterile wrapper, an exterior surface of the first longitudinal end of the sterile wrapper comprising an indicia indicating a position of the first upper end of the beverage ingredient cartridge, the sterile wrapper comprising a notch disposed between the first and second longitudinal ends, the notch being configured to facilitate tearing of the sterile wrapper along a tearing direction transverse to a longitudinal direction of the sterile wrapper. In some embodiments, the assembly further includes a second removable beverage ingredient cartridge receptacle portion, the second beverage ingredient cartridge receptacle portion comprising a second receptacle wall portion sized to receive the second cartridge housing, a second upper end with a plurality of second struts extending from the second upper end and each having a second hook portion, and a second piercing member configured to pierce a second frangible seal member when a second beverage ingredient cartridge is inserted into the second beverage ingredient cartridge receptacle portion, in use. In some embodiments, the assembly further includes a second beverage ingredient cartridge having a second cartridge housing with a second upper end that is closed, a second lower end with a second opening defining a second ingredient discharge passage, a second frangible seal member sealed over the second ingredient discharge passage, and a second beverage ingredient contained within the second cartridge housing by the second frangible seal member. In some embodiments, the assembly further comprises a retainer member disposed between the adapter member and the lid member and configured to retain the first cartridge in the first removable beverage ingredient cartridge receptacle portion, in use. The retainer member comprising a peripheral portion, a cartridge blocking portion, and a fluid passage portion disposed between the peripheral portion and the cartridge blocking portion, the peripheral portion being sized to fit between and be secured in place by the adapter member and the lid member, the cartridge blocking portion being without any apertures large enough for the first beverage ingredient cartridge to pass through, the fluid passage portion comprising one or more apertures configured to allow a mixed beverage from the liquid container to pass therethrough. In some embodiments, the first removable beverage ingredient cartridge receptacle portion comprises a first upper end with a plurality of first struts extending from the first upper end and each having a first hook portion, and the mounting flange includes a least a plurality of locking apertures configured to receive each first hook portion.

In another aspect a beverage mixing and dispensing device includes an adapter member and a lid member. The adapter member includes a lower end portion, an upper mouth portion, a beverage ingredient cartridge receptacle portion, and at least a first liquid flow passage. The lower end portion is configured to engage a liquid container. The beverage ingredient cartridge receptacle portion comprising a first receptacle wall portion sized to receive a beverage ingredient cartridge, and a first piercing member configured to pierce a frangible seal on the beverage ingredient cartridge when the beverage ingredient cartridge is inserted into the beverage ingredient cartridge receptacle portion, in use. The first liquid flow passage is configured to allow liquid to flow from the lower end portion, through the first liquid flow passage and out through the upper mouth portion. The lid member is configured to engage the upper mouth portion of the adapter member.

Various embodiments of the various aspects may be implemented. In some embodiments, the lid member comprises a ring member and a baby bottle nipple. In some embodiments, the lid member comprises a closeable drinking port. In some embodiments, the device further includes a beverage ingredient cartridge sealed in a sterile wrapper, the sterile wrapper comprising a first longitudinal end and a second longitudinal end, the first upper end of the first beverage ingredient cartridge being positioned at the first longitudinal end of the sterile wrapper, an exterior surface of the first longitudinal end of the sterile wrapper comprising an indicia indicating a position of the first upper end of the beverage ingredient cartridge, the sterile wrapper comprising a notch disposed between the first and second longitudinal ends, the notch being configured to facilitate tearing of the sterile wrapper along a tearing direction transverse to a longitudinal direction of the sterile wrapper. In some embodiments, the device further includes a second removable beverage ingredient cartridge receptacle portion, the second beverage ingredient cartridge receptacle portion comprising a second receptacle wall portion sized to receive the second cartridge housing, a second upper end with a plurality of second struts extending from the second upper end and each having a second hook portion, and a second piercing member configured to pierce a second frangible seal member when a second beverage ingredient cartridge is inserted into the second beverage ingredient cartridge receptacle portion, in use. In some embodiments, the device further includes a second beverage ingredient cartridge having a second cartridge housing with a second upper end that is closed, a second lower end with a second opening defining a second ingredient discharge passage, a second frangible seal member sealed over the second ingredient discharge passage, and a second beverage ingredient contained within the second cartridge housing by the second frangible seal member. In some embodiments, the device further includes a retainer member disposed between the adapter member and the lid member and configured to retain the a beverage ingredient cartridge in the beverage ingredient cartridge receptacle portion, in use, the retainer member comprising a peripheral portion, a cartridge blocking portion, and a fluid passage portion disposed between the peripheral portion and the cartridge blocking portion, the peripheral portion being sized to fit between and be secured in place by the adapter member and the lid member, the cartridge blocking portion being without any apertures large enough for the beverage ingredient cartridge to pass through, the fluid passage portion comprising one or more apertures configured to allow a mixed beverage from the liquid container to pass therethrough. In some embodiments, the beverage ingredient cartridge receptacle portion comprises an upper end with a plurality of struts extending from the upper end and each having a hook portion, and wherein the adapter member comprises a least a plurality of locking apertures configured to receive each hook portion. In some embodiments, the device further includes a liquid container having a reservoir portion and a mouth portion, the mouth portion comprising an external threaded portion configured for threaded engagement and a first beverage ingredient cartridge having a first cartridge housing with a first upper end that is closed, a first lower end with a first opening defining a first ingredient discharge passage, a first frangible seal member sealed over the ingredient discharge passage, and a first beverage ingredient contained within the first cartridge housing by the first frangible seal member. In some embodiments, the beverage ingredient cartridge receptacle portion is removably mounted to the adapter member. In some embodiments, the beverage ingredient cartridge receptacle portion has a receptacle central axis that is offset an adapter central axis. In some embodiments, the device further comprises a mounting flange supporting the beverage ingredient cartridge receptacle portion, wherein the first liquid flow passage being formed in the mounting flange and being roughly half-moon shaped. In some embodiments, in use, a portion of an outer surface of the beverage ingredient cartridge positioned in the beverage ingredient cartridge receptacle portion is exposed to fluid flowing through the first liquid flow passage.

In another aspect a beverage ingredient cartridge assembly includes a beverage ingredient cartridge and a sterile wrapper. The beverage ingredient cartridge includes a cartridge housing with an upper end that is closed, a lower end with an opening defining an ingredient discharge passage, a frangible seal member sealed over the ingredient discharge passage, and a beverage ingredient contained within the cartridge housing by the frangible seal member. The sterile wrapper encloses the beverage ingredient cartridge. The sterile wrapper includes a first longitudinal end and a second longitudinal end, the upper end of the beverage ingredient cartridge being positioned at the first longitudinal end of the sterile wrapper, the sterile wrapper comprising a notch disposed between the first and second longitudinal ends, the notch being configured to facilitate tearing of the sterile wrapper along a tearing direction transverse to a longitudinal direction of the sterile wrapper.

Various embodiments of the various aspects may be implemented. In some embodiments, an exterior surface of the first longitudinal end of the sterile wrapper includes an indicia indicating a position of the upper end of the beverage ingredient cartridge.

In another aspect, a method of mixing a beverage includes attaching to a liquid container, an adapter member comprising a lower end portion configured to engage a liquid container; and attaching to the liquid container, a first removable beverage ingredient cartridge receptacle, the first beverage ingredient cartridge receptacle comprising a first receptacle wall portion sized to receive a first beverage ingredient cartridge.

Various embodiments of the various aspects may be implemented. In some embodiments, the method further includes inserting a first beverage ingredient cartridge into the first removable beverage ingredient cartridge receptacle, piercing a sealed end of the first beverage ingredient cartridge, discharging a first beverage ingredient from the first beverage ingredient cartridge into the liquid container, and mixing the first beverage ingredient with an amount of liquid in the liquid container. In some embodiments, the method further includes removing from the adapter member the first beverage ingredient cartridge receptacle and attaching to the adapter member a second beverage ingredient cartridge receptacle, the second beverage ingredient cartridge receptacle comprising a second receptacle wall portion sized to receive a second beverage ingredient cartridge larger than the first beverage ingredient cartridge. In some embodiments, the method further includes inserting a second beverage ingredient cartridge into the second removable beverage ingredient cartridge receptacle, piercing a sealed end of the second beverage ingredient cartridge, discharging a second beverage ingredient from the second beverage ingredient cartridge into the liquid container, and mixing the second beverage ingredient with another amount of liquid in the liquid container.

In another aspect, a method of mixing a beverage includes gripping a first portion of a first beverage ingredient cartridge wrapper and a first end of a first beverage ingredient cartridge enclosed in the first beverage ingredient cartridge wrapper, gripping a second portion of the first beverage ingredient cartridge wrapper, tearing the second portion of the first beverage ingredient cartridge wrapper away from the first portion of the first beverage ingredient cartridge wrapper during said step of gripping, exposing a second end of the first of the first beverage ingredient cartridge, inserting the first beverage ingredient cartridge into a first beverage ingredient cartridge receptacle which is connected to a liquid container, and discharging into the liquid container, a first ingredient from the of the first beverage ingredient cartridge.

While certain aspects, advantages and novel features of embodiments of the inventions are described herein, it is to be understood that not necessarily all such advantages can be achieved in accordance with any particular embodiment of the inventions disclosed herein. Thus, the inventions disclosed herein can be embodied or carried out in a manner that achieves or selects one advantage or group of advantages as taught herein without necessarily achieving other advantages as can be taught or suggested herein.

BRIEF DESCRIPTION OF THE DRAWINGS

Embodiments disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIG. 1 is a side elevational view of a beverage mixing in dispensing assembly, with a lid removed and shown in an exploded view.

FIG. 2A is a side elevational view of the beverage mixing and drinking in a further exploded view showing the beverage container, a cartridge receptacle adapter, a cartridge, and the lid in an exploded view.

FIG. 3 is an enlarged sectional partial exploded view of the assembly of Figure one, including the upper end of the container, and the cartridge receptacle adapter shown in a disassembled state.

FIG. 4 is a cross-sectional view of the upper end of the container and adapter a Figure three, shown in a connected state.

FIG. 12 is a perspective view of a modification of the adapter and cartridges receptacle assembly of FIG. 1

FIG. 13A is a side elevational unexploded view of the adapter of FIG. 12.

FIG. 14 is a side elevational view of the adapter of FIG. 12 and a cartridge and in an exploded view.

FIG. 15 is a perspective view of the adapter and cartridge of FIG. 14.

FIG. 16 is a sectional view of the adapter and cartridge of FIG. 14, in an exploded state.

FIG. 17 is a side elevational and sectional view of the cartridge and adapter of FIG. 16, in which the cartridge is in a partially inserted state period.

FIG. 18 is a side elevational cross-sectional view of the assembly of FIG. 12 showing the cartridge fully inserted into the cartridge receptacle, a retention member positioned over the cartridge, and a baby bottle top positioned for attachment to the adapter.

FIG. 19 is a side elevational cross-sectional view of the assembly a FIG. 18 with the baby bottle top engaged with the adapter and inverted to illustrate a position during consumption of the mixed beverage therein.

FIG. 23 is a perspective as a top plan view of a modification of the adapter a FIG. 20.

FIG. 24 is a perspective view of the adapter FIG. 23.

FIG. 25 as a side elevational view of the adapter FIG. 23.

FIG. 26 is a side elevational cross-sectional view of the adapter of FIG. 23.

FIG. 27 is a top plan view of a removable cartridge receptacle configured for engagement with the adapter a FIG. 23.

FIG. 28 is a bottom plan view of the adapter cartridge receptacle of FIG. 27.

FIG. 29 is a side elevational view of the cartridge receptacle of FIG. 27.

FIG. 30 is a perspective view of the cartridge receptacle of FIG. 27.

FIG. 31 is a side elevational cross-sectional view of the receptacle of FIG. 27.

FIG. 38 is a side elevational and schematic view of a cartridge in a sealed, frangible wrapper, being grasped by a user.

FIG. 39 is a schematic side elevational view of the cartridge of FIG. 38 with the wrapper having been torn.

FIG. 40 is a side elevational schematic view of the cartridge or FIG. 38 with half of the wrapper having been removed while being grasped by a user by one end.

FIG. 41 is a side elevational and schematic view of a cartridge in a modified sealed, frangible wrapper, being grasped by a user.

FIG. 42 is a schematic side elevational view of the cartridge of FIG. 41 with the wrapper having been torn.

FIG. 43 is a side elevational schematic view of the cartridge or FIG. 41 with half of the wrapper having been removed while being grasped by a user by one end.

FIG. 44 is a side elevational and schematic view of a cartridge in another modified sealed, frangible wrapper, being grasped by a user.

FIG. 45 is a schematic side elevational view of the cartridge of FIG. 44 with the wrapper having been torn.

FIG. 46 is a side elevational schematic view of the cartridge or FIG. 44 with half of the wrapper having been removed while being grasped by a user by one end.

DETAILED DESCRIPTION OF EMBODIMENTS

Figure 2B:
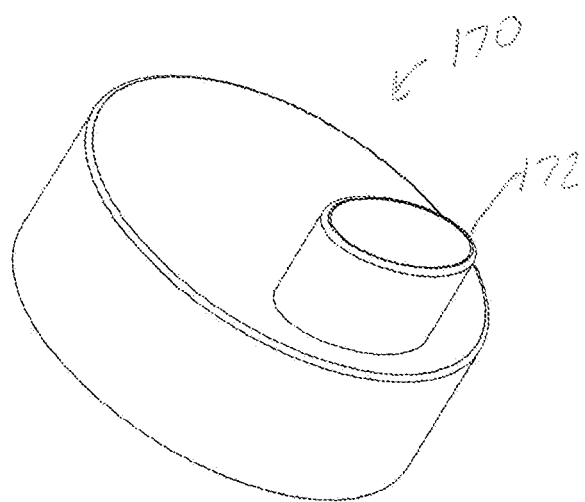
FIG. 2B is a top and side elevational view of a modification of the lid illustrated in FIG. 2A.

The inventions disclosed herein are described in the context of beverage ingredient mixing and dispensing assemblies that can be used for mixing beverage ingredients with other liquids, such as water and for dispensing the mixed beverage, for example, through a drinking port, because they have particular utility in this context. However, the inventions disclosed herein can be used in other contexts as well, including but without limitation, dispensers for other types of ingredients and liquids, for attachment to other types of devices, other food and beverage related contexts, pharmaceutical mixing, and/or delivery devices, as well as other contexts.

FIGS. 1-11 illustrate a first embodiment of a beverage mixing and dispensing assembly 100. FIGS. 12-40 illustrate variations and further embodiments of the assembly 100. The embodiments of FIGS. 12-40 are identified generally by the reference numbers 200, 300, 400, 500. Various parts, components, and features of the embodiments of FIGS. 1-40 are identified using reference numerals with the same ones and tens digits used to identify the same or similar parts, components, and features of the other embodiments, but with the hundreds digit (e.g., 100, 200, 300, 400, 500) corresponding to the subject embodiment. Thus, for brevity, descriptions of the same or similar components amongst the various embodiments are not repeated for each of those embodiments, Thus, the below descriptions of any components, features, or parts regarding one embodiment applies to the commonly numbered components, features, or parts of the other embodiments where such a description is omitted, or unless a different or supplemental description is provided for the subject embodiment.

Optionally, at least some of the embodiments disclosed here and can be configured to be used with a primary container, such as a beverage container. In some environments of us, such a primary container can be a beverage or water bottle that is commercially available. It has been determined that a substantial portion of the commercially available beverage bottles, in particular water bottles, have openings that fall within a well-defined range of sizes. This includes both the types of single use water bottles commonly sold in convenience stores as well as reusable and refillable water bottles that include various different kinds of lids.

With continued reference to FIGS. 1-4, the beverage mixing and dispensing assembly 100 includes a reusable beverage bottle 102, an adapter 110 and a lid 170.

Figure 2C:
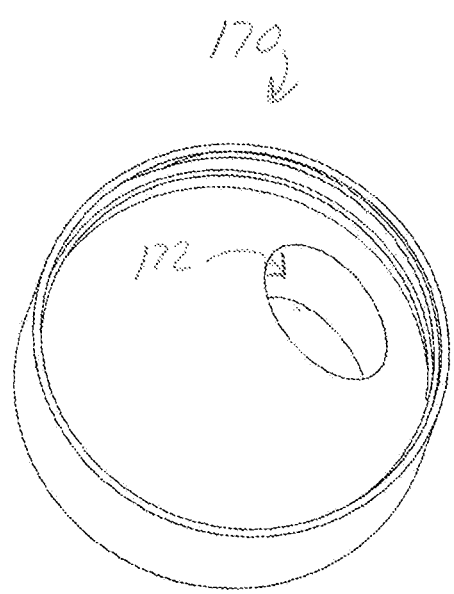
FIG. 2C is a top and side elevational view of the lid illustrated in FIG. 2B.

The bottle 102 can be any type and any size of water bottle, such as refillable water bottles that are commonly available in various different sizes, and including specialty beverage bottles, such as bottles designed for baby formula. In the illustrated embodiment, the bottle 102 includes an upper neck portion 104, a sealing flange 106 and a threaded mouth portion 108 (FIG. 2). In some embodiments, the threaded mouth portion can have a diameter of approximately 60 millimeters with external threads. However, this is merely an example of one diameter that can be used, other diameters can also be used.

With continued reference to FIGS. 3 and 4, the adapter 110 includes a lower portion 112 configured to engage the threaded mouth portion 108 of the bottle. For example, the lower portion 112 of the adapter 110 can include the lower outer wall portion 114 that has internal threads 116 configured to engage the external threads 109 of the threaded mouth portion 108.

The upper portion 120 of the adapter 110 can include an upper outer wall 122 with external threads 124 configured to engage corresponding threads within the lid 170.

Additionally, the adapter 110 can include a cartridge receptacle portion 130 configured to receive beverage ingredient cartridges, such as the cartridge 160 (FIG. 2). For example, the cartridge receptacle portion 130 can include a sidewall 132 having a shape generally complimentary to an outer surface or overall shape of the cartridge 160. In the illustrated embodiment, the wall 132 is cylindrical, however, other shapes can also be used. The wall 132 can have an upper end 134 having an inner diameter sufficiently large to receive the cartridge 160. Optionally, the upper end 134 of the wall 132 can include a ridge 136 configured to engage with corresponding features of the cartridge 160 so as to provide tactile feedback during insertion and or snap fit engagement of the cartridge 160 with the receptacle portion 130. Additionally, the lower portion 133 of the wall 132 can include a cartridge piercing assembly 138.

The cartridge piercing assembly 138 can be configured to pierce a frangible seal of an ingredient cartridge, such as the ingredient cartridge 160. The piercing assembly 138 can be configured in numerous different ways, as many different shapes are known for performing such a function. For example, U.S. Patent Publication No. 2018/0072473 includes various different designs for piercing ingredient cartridges, the entire contents of which is hereby expressly incorporated by reference.

In the illustrated embodiment, the piercing assembly 138 includes a central piercing boss 140, which optionally, can include a sharpened point 141. The sharpened point 141 can optionally be provided for enhancing the puncturing action of the piercing boss 140 when a cartridge (e.g., cartridge 160) is pressed against the piercing boss 140.

Optionally, the piercing boss 140 can be supported in a position generally aligned with or precisely aligned with the central axis 142 of the piercing assembly 138, for example, a central axis 142 of the cylindrical wall 132 (FIG. 4).

The piercing boss 140 can be supported by a plurality of struts 143. The piercing assembly 138 can include any number of struts 143. In the illustrated embodiment, the piercing boss 140 is supported by four (4) struts 143. Other numbers of struts can also be used.

The struts 143 can be generally arranged in a circular arrangement and evenly or unevenly spaced apart. In the illustrated arrangement, the struts 143 are arranged in a conical arrangement with upper ends 144 spaced closer together around the piercing boss 140 and lower ends 145 disposed farther apart than the upper ends 144. Optionally, the lower ends 145 of the struts 143 can be attached directly to the lower portion 133 of the cylindrical wall 132.

In the illustrated embodiment, the piercing assembly 138 includes a lower collar portion 146 to which the lower ends 145 of the struts 143 are attached. The collar portion 146 can be mounted such that an outer surface of the collar 146 is spaced inwardly from an inner surface of the cylindrical wall 132. In some embodiments, the spacing 147 between the outer surface of the collar 146 and the inner surface of the cylindrical wall 132 is larger than a wall thickness of the cartridge 160 (described in greater detail below).

As such, the spacing 147 can accommodate nesting of a lower end of the ingredient cartridge 160 around the collar 146. This optional feature can provide optional additionally benefits. For example, after the cartridge 160 has been pressed downwardly onto the piercing assembly 138, and the frangible seal on the lower end of the cartridge 160 being thereby pierced, the collar 146 can provide for a further opening of the foil, which can thereby enhance mixing of an ingredient disposed within the cartridge 160, described in greater detail below with reference to FIGS. 8-10.

Figure 5:
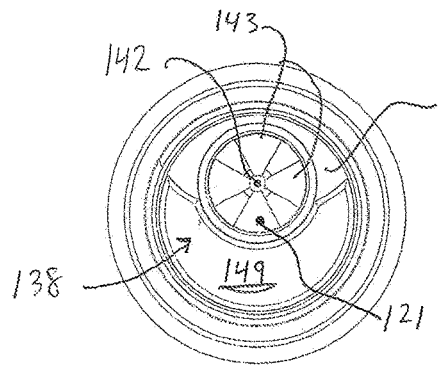
FIG. 5 is a top plan view of the adapter of FIG. 2.
Figure 6:
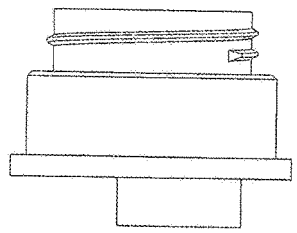
FIG. 6 is a side elevational view of the adapter of Figure two.
Figure 7:
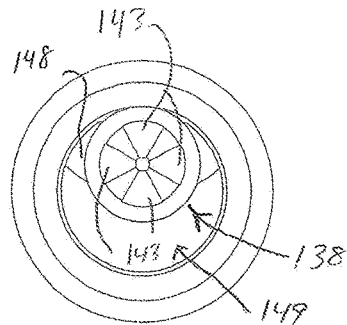
FIG. 7 is a bottom plan view of the adapter of FIG. 5.
Figure 8:
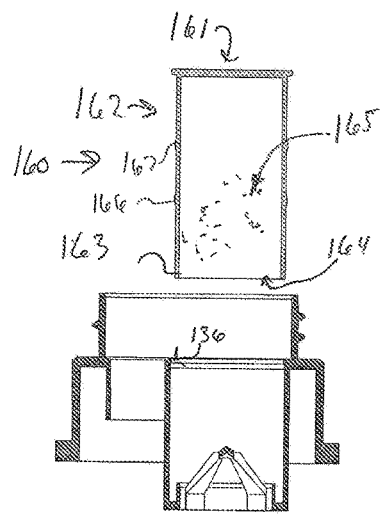
FIG. 8 is a partially exploded and sectional side elevational view of the adapter a FIG. 5 and the cartridge of FIG. 2 in a state just prior to the cartridge being inserted into the cartridge receptacle.

With reference to FIGS. 5 and 7, the central axis 142 of the piercing assembly 138 can be offset from the central axis 121 of the adapter 110. As such, the piercing assembly and cylindrical wall 132 can be offset from a center of the adapter 110 and thus the bottle 102 although they may still overlap, as in the embodiment of FIGS. 1-11.

Optionally, the piercing assembly 138 can be secured to or adjacent to an inner sidewall of the adapter 110. For example, the adapter 110 can optionally include an inner collar 111 which can be sized to extend into an interior of the mouth 108 of the bottle 102. Optionally, the piercing assembly 138 can be mounted directly to the collar 111. Further, in other embodiments, the adapter 110 can include a mounting flange 148 supporting the piercing assembly 138 in a desired location. In some embodiments, the mounting flange 148 extends from the outer surface of the cylindrical sidewall 132, to the inner collar 111. The flange 148 can extend completely around the entire inner collar 111 or only partially. In the illustrated embodiment, the mounting flange 148 extends approximately 180 degrees around the cylindrical sidewall 132 but less than 180 degrees around the inner collar 111. This configuration leaves a fluid passage 149 disposed between the inner surface of the inner collar 111 and the outer surface of the cylindrical sidewall 132. As such, a liquid, such as a mixed beverage within the bottle 102, can be discharged through the passage 149 and outward through the upper end 120 of the adapter 110.

With references to FIGS. 2 and 8-10, the ingredient cartridge 160 can include a top end portion 161, a sidewall portion 162, a lower end opening 163, and a frangible wall portion 164. A beverage ingredient 165 can be disposed within the cartridge 160. For example, the beverage ingredient 165 can be in the form of powdered, dried ingredients designed to be mixed with water or other liquids which may be contained in the bottle 100. In some embodiments, the beverage ingredient 165 can be in the form of powders designed to create energy drinks, hydration drinks, pre-workout drinks, meal replacements, baby formula, or other beverages, when mixed with water or other liquids.

The sidewall 162 of the cartridge 160 can be in the form of a cylindrical, plastic wall member configured to, along with the top 161 and the frangible seal assembly 164, form an internal reservoir for containing the beverage ingredient 165. In some embodiments, the wall 161 and the cylindrical sidewall 162 can be formed from a single, molded piece of food-grade plastic.

The seal assembly 164 can be in the form of a frangible membrane or layer sealed to the opening 163. The seal 164 can be in the form of plastic of foil layers designed to be durable for purposes of shipping and handling but to also be pierceable with a piercing assembly such as the piercing assembly 138 described above. Such types of pierceable or frangible materials are well-known in the art. In some embodiments, the frangible seal member 164 is designed, as noted above, to be sufficiently strong to resist or prevent rupture during handling and shipping, but sufficiently weak so as to be pierceable with the piercing boss 140 when the seal 164 is brought into contact with the piercing boss 140 with a magnitude of force easily achievable with the user's hand.

Additionally, the cartridge 160, in some embodiments, can include one or more ridges 166, 167. Optionally, the ridges 166, 167 can be configured to provide a tactile feedback when the cartridge 160 is inserted into the piercing assembly 138 so as to pass the ridges 166, 167 over the ridge 136 on the inner side of the sidewall 132. For example, the outer diameter of the ridges 166, 167 can be slightly larger than the inner diameter of the ridge 136. In some embodiments, the material used for the adapter 110 is harder and/or is formed so as to be stiffer than the material used or configuration used for forming the cartridge 160 and the ridges 166, 167. Thus, during insertion of the cartridge 160 from the position shown in FIG. 8 to the position shown in FIG. 9, the ridge 166 would be elastically deformed inwardly, by a small amount, thereby producing a tactile feedback for the user during insertion.

Figure 9:
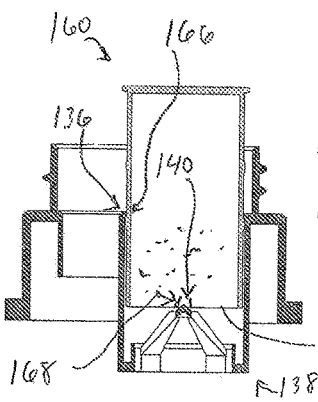
FIG. 9 is a side elevational and cross-sectional view of the adapter and cartridge of FIG. 8, where the cartridge has been inserted until the bottom end of the cartridge contacts the piercing assembly.

Optionally, with reference to FIG. 9, the ridge 166 and ridge 136 are arranged such that when the cartridge 160 is inserted into the piercing assembly 138, the ridge 166 passes the ridge 136 at about the point where the frangible seal 164 makes initial contact with the piercing boss 140. This can optionally provide the user with feedback for indicating that the seal 164 has made contact with the piercing boss 140 and/or that the seal 164 has been pierced. As shown in FIG. 9, small pieces of torn seal 168 are formed with then piercing boss 140 passes into and pierces the seal 164.

Figure 10:
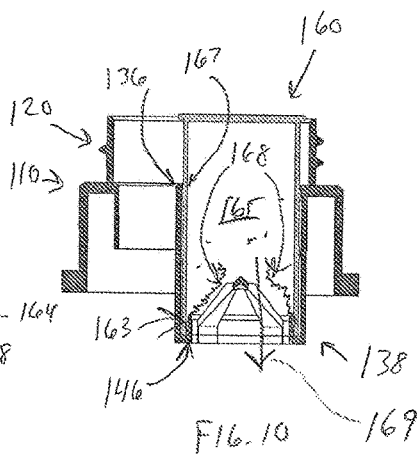
FIG. 10 is a sectional view of the adapter and cartridge a FIG. 8, in which the cartridge has been fully inserted into the cartridge receptacle.
Figure 11:
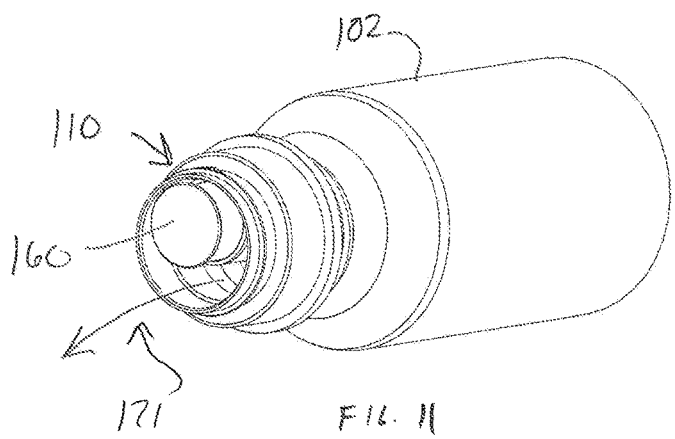
FIG. 11 is a perspective view of the beverage container, adapter and cartridge.

With reference to FIG. 10, the cartridge 160 has been pushed completely into the piercing assembly 138 such that the ridge 167 has passed the ridge 136. Optionally, the ridge 167 and ridge 136 can be arranged such that the ridge 167 passes over the ridge 136 when the cartridge 160 has been fully inserted into the piercing assembly 138. As shown in FIG. 10, the lower edge of the lower opening 163 of the cartridge 160 has been inserted over the collar 146 of the piercing assembly 138. In this position, the collar 146 pushes the torn pieces of seal 168 outwardly, which can aid in the discharge of the beverage ingredient 165, in the direction of arrow 169. In use, therefore, the beverage ingredient 165 is discharged into the bottle 102, and thus mixed with any liquids that may be in the bottle 102, forming a mixed beverage. It is possible, in use, that some of the beverage ingredient 165 will be captured by pieces of the torn seal 168.

Thus, in use, after the cartridge 160 has been inserted into the position illustrated in FIG. 10, a user can attach the lid 170 to the upper portion 120 of the adapter 110, and thereafter shake the entire bottle 102 to entrain the beverage ingredient 165 into the liquid within the bottle 102 and to help rinse out any remaining ingredient 165 from the cartridge 160. After the user has shaken the bottle 102, the user can remove the lid 170 and tip the bottle 102 to discharge the mixed beverage from the bottle 102, in the direction of the arrow 171. In such a configuration, the mixed beverage can make contact with a portion of the outer surface of the cartridge 160.

In some embodiments, the lid 170 can be a solid member having internal threads (not shown) configured to threadedly engage the threads 124 on the adapter 110. In other embodiments, the lid 170 can be in the form of a feeding nipple for a baby bottle. Further, the lid 170 can include other drink-through spouts, such as a chug nozzle, a hinged nozzle, a straw, or other types of drinking nozzles or ports.

In the configuration of the embodiment of FIGS. 1-11, by positioning the piercing assembly 138 offset from the center axis 121 of the adapter 110, the opening 149 can have a larger cross-sectional dimension, thereby providing for a larger, less interrupted flow of mixed beverage out of the bottle 102. In some embodiments, the shape of the passage 149 is roughly half-moon shaped, which more closely matches a natural cross sectional shape of a flow of liquid being poured out of a round opening. If, on the other hand, the piercing assembly 138 were disposed centered along the axis 121 of the adapter 110, the remaining area or passages around the piercing assembly 138 would have a narrower cross-sectional dimension and thus would result in a smaller cross-sectional dimension of the flow of liquid poured out of the bottle 102.

FIGS. 12-19 illustrate a modification of the beverage mixing and dispensing assembly 100, identified generally by the reference numeral 200. As noted above, various parts, components, and features of the assembly 200 that are the same or similar to those of the assembly 100 are identified by the same reference numbers, except that "100" has been added thereto.

With reference to FIGS. 13A and 14, the adapter 210 is configured with the cartridge piercing assembly 238 positioned such that the central axis 242 of the piercing assembly 238 is aligned with the central axis 221 of the adapter 210. Thus, as shown in FIG. 15, the sidewall 232 is supported within the adapter 210 by a plurality of support struts 248a. This arrangement provides for a plurality of struts 248a and a plurality of passages 249a disposed between the struts 248a, the outer surface of the sidewall 238 and inner side of adapter 210. In the illustrated embodiment, the struts 248a and passages 249a are evenly spaced around the piercing assembly 238. However, other arrangements can also be used.

Figure 13B:
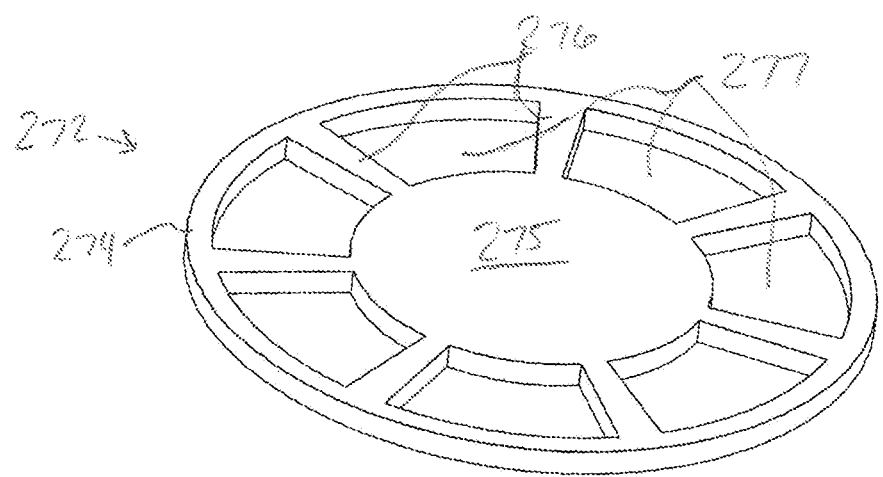
FIG. 13B is a perspective view of a retainer member shown in FIG. 13A.

With reference to FIG. 13B, The assembly 200 can optionally include a retainer plate 272. The retainer plate 272 can be in the form of a disk member having a peripheral edge portion 274, a central blocking portion 275 and the plurality of struts 276 extending from the peripheral member 274 to the central blocking portion 275. Spaces between the struts 276 form passages 277 through the retaining member 272. The blocking portion 275 can be configured to contact the cartridge 260 so as to block the cartridge 260 from moving out of the cartridge receptable 230. In some embodiments, the blocking portion 275 can be solid or perforated, provided that there are no passages or apertures in the blocking portion 275 that are large enough to allow the cartridge 260 to pass through the blocking portion 275. Other configurations can also be used.

As noted above, in use, the retainer member 272 can be used to help retain the cartridge 260 within the piercing assembly 238. As such, the cartridge 260 is less likely to become dislodged from the piercing assembly 238 which could lead to interference with the discharge of mixed beverage from the bottle 102 through the lid assembly 270.

In the illustrated embodiment, the lid assembly 270 is in the form of a baby bottle top. Thus, the lid assembly 270 includes a ring portion 280 and a soft pliable nipple portion 282.

With reference to FIG. 18, the ring portion 280 includes an upper flange member 281 which cooperates with a lower flange portion 283 of the pliable nipple portion 282. As such, when assembled, the flange portion 281 opposes the flange portion 283 and thus retains the pliable nipple portion 282 in place during use.

The retaining member 272 is sized to fit within an inner diameter of the ring portion 280 and thus, in use, when the ring portion 280 is screwed down on the upper portion 220 of the adapter 210 the retainer member 272 is captured between the flange portion 283 and the upper end of mouth portion 220 (see FIG. 19).

Thus, in use, with reference to FIGS. 16-19, a user can insert the cartridge 260 into the piercing assembly 238. As shown in FIG. 17, after the ridge 266 passes the ridge 236, the frangible seal 264 makes contact with the piercing boss 240 and thus pieces of torn seal 268 are created by the piercing boss 240. The user can continue to push the cartridge 260 downwardly, and as shown in FIG. 18, the ridge 267 passes the ridge 236 when the cartridge 260 is fully seated into the piercing portion 238. In this position, the frangible seal is torn as much as possible in this configuration, by the piercing boss 240 and the struts 243.

With the cartridge 260 in this position, as shown in FIG. 18, the retainer 272 can be placed on top of the cartridge 260. Then, the ring 280 can be screwed to the upper portion 220 of the adapter 210 (FIG. 19). As the frangible seal 264 is pierced, the beverage ingredient 265 can fall through the pierced portion of the frangible seal 264, into any attached bottle (not shown). Further, as is common with the use of mixing formula in baby bottles, user could place their finger over the top of the nipple portion 282 and shake the bottle with the adapter 220 attached to mix the beverage ingredient 265 to mix the desired baby formula. In use, the bottle (not shown) and adapter 210 might be inverted, thereby allowing the mixed formula to flow through the passages 148a of the adapter 210 and the passages 277 and out through the tip of the nipple portion 282.

In this configuration, even though the center axis 242 of the cartridge receptable 230 and the center axis 221 of the adapter 210 are aligned (FIG. 14), the mixed beverage can flow from the bottle (not shown) around the cartridge receptacle 230 and the cartridge 260, and out through a drinking port, i.e., the nipple portion 282. Further, the retainer 272 prevents the cartridge 260 from falling downwardly (as viewed in FIG. 19) which could thereby interfere with consumption by user, such as an infant or toddler.

Figure 20:
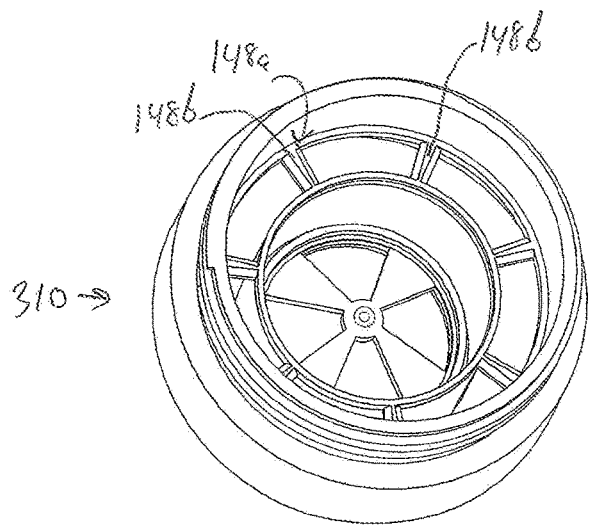
FIG. 20 is a perspective view of a modification of the adapter of FIGS. 12 through 19.
Figure 21:
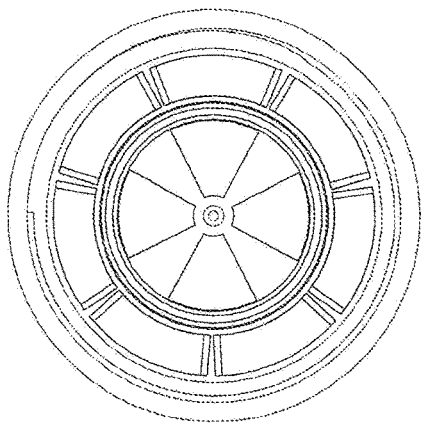
FIG. 21 is a top plan view of the adapter FIG. 20.
Figure 22:
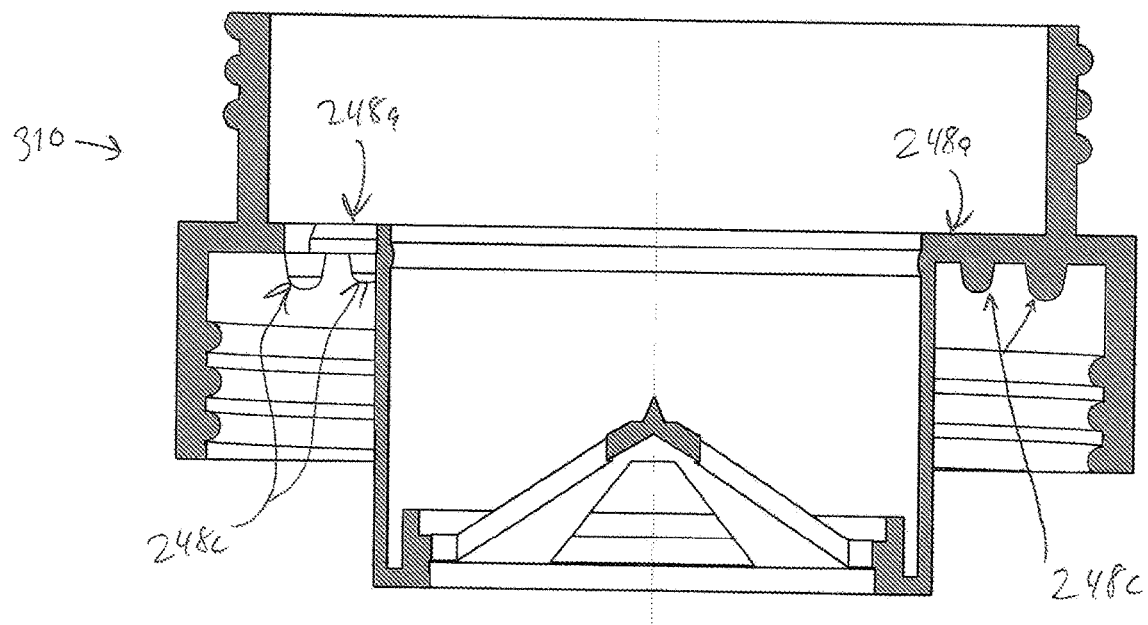
FIG. 22 is a side elevational cross-sectional view of the adapter of FIG. 20.
Figure 32:
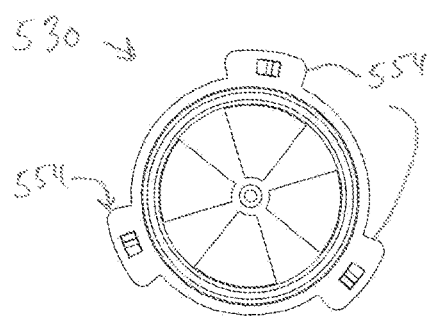
FIG. 32 is the top plan view of a modification of the receptacle of FIG. 27.
Figure 33:
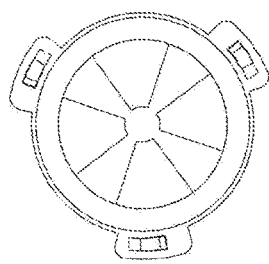
FIG. 33 is a bottom plan view of the receptacle of FIG. 32.
Figure 34:
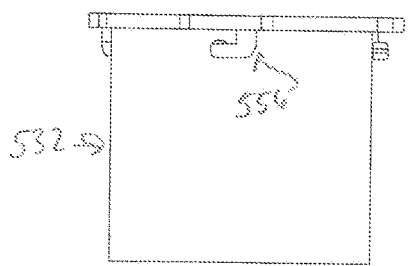
FIG. 34 is a side elevational view of the receptacle of FIG. 32.
Figure 35:
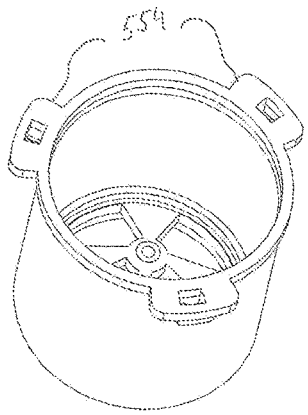
FIG. 35 is a perspective view of the receptacle of FIG. 32.
Figure 36:
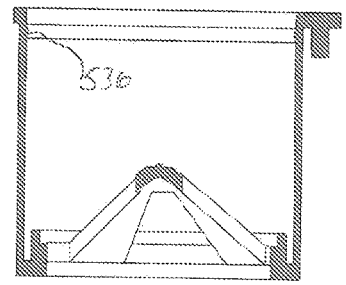
FIG. 36 is a side elevational cross-sectional view of the receptacle of FIG. 32.

FIGS. 20-22 illustrate a modification of the adapter 210, identified generally by the reference numeral 310.

In this modification, the struts 248a include tapered upper edges 248b which help mixing the breakup of clumps of powdered ingredient 265, which in some applications, can be baby formula.

With reference to FIG. 22, optionally, the adapter 310 can include mixing agitators 248c. In some embodiments, the mixing agitators 248c are in the form of round or conical studs protruding downwardly from bottom surfaces of the struts 248a. Other configurations can also be used.

In such a configuration, the tapered edges 248b and/or the mixing agitators 248c can assist in further breaking up dried beverage ingredient 265 which can form clumps during mixing.

Figure 37:
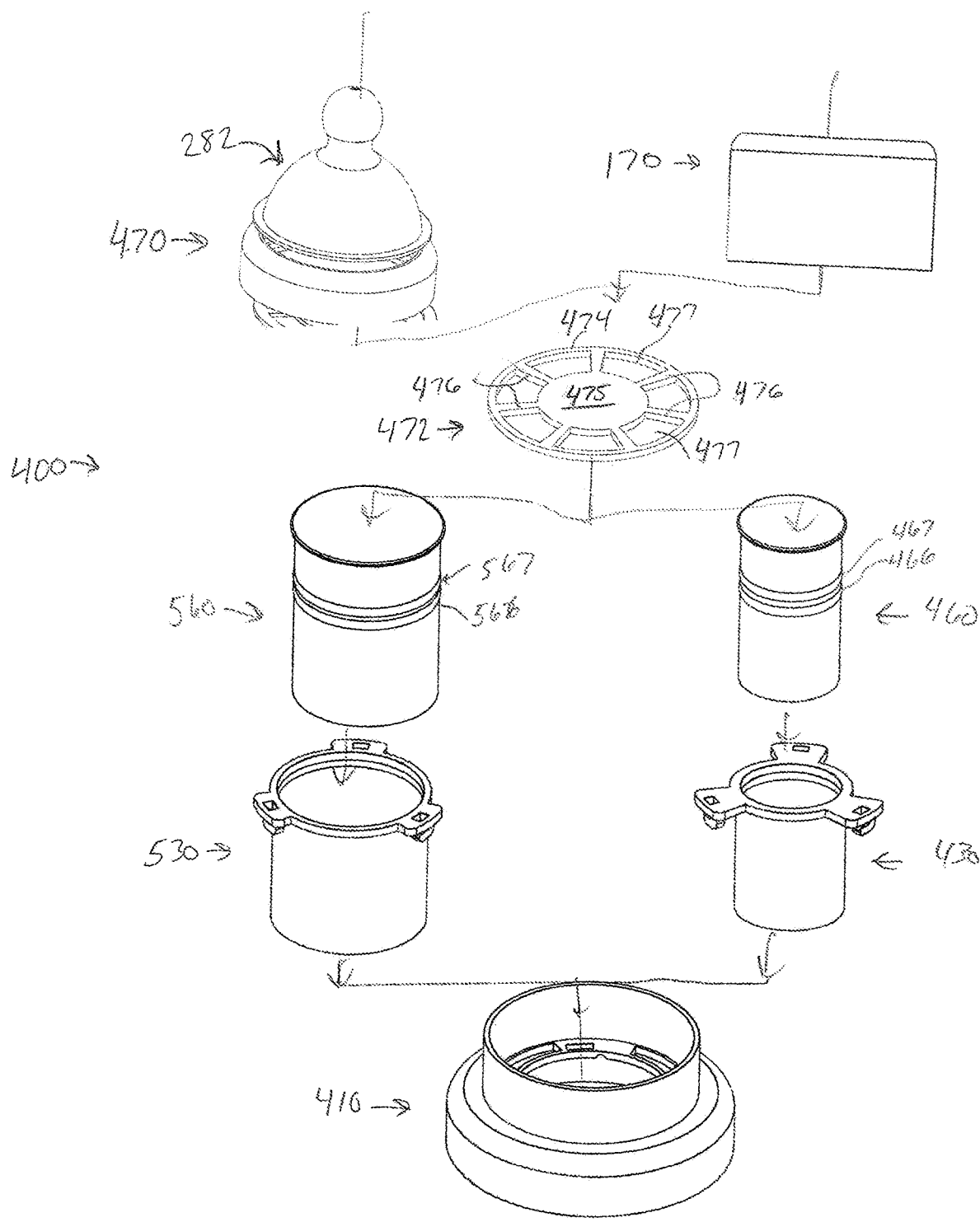
FIG. 37 is an exploded view illustrating optional configurations of the adapter of FIG. 23 with the receptacles of FIGS. 27 through 31 and the receptacles of FIGS. 32-36.

FIGS. 23-37 illustrate another modification of the assembly 100, identified generally by the reference numeral 400 (FIG. 37).

The beverage mixing and dispensing assembly 400 of the present embodiment can include interchangeable cartridge receptacles, which optionally, can be used for accommodating different sized cartridges. However, other benefits and uses can also be achieved.

With reference to FIGS. 23-26, the adapter 410 can include a mounting flange 448 which extends inwardly from an inner surface of the adapter 410. The mounting flange can include a plurality of beverage passages 449, one or more piercing assembly mounting apertures 448d and a central receiving aperture 448e. Further, with reference to FIG. 24, a locking recess 448f can be disposed adjacent to each of the locking passages 448d. As illustrated above with reference to the adapter 110, the adapter 410 can include an upper portion 420 with external threads (not shown) and a lower portion 412 with internal threads (not shown).

FIGS. 27-31 illustrate a first removable receptacle portion 430. In the illustrated embodiment, the first receptacle portion 430 includes a sidewall 432 with a lower end 433 and a piercing assembly 438. Additionally, the first removable receptacle portion 430 includes an upper end having a plurality of support struts 454 extending outwardly from the upper end and configured to engage the locking receptacles 448d. For example, in the illustrated embodiment, each of the support struts 454 include a locking hook 455 with a locking rib 456. The locking hooks 455 are arranged near the distal ends of the struts 454 and are sized to pass through the locking receptacles 448d (FIG. 23). The sidewall 432 of the removable receptacle portion 430 can be sized to receive a first sized cartridge, for example, cartridge 460 (FIG. 37), which can include ridges 467 and 466 configured to interact with ridge 436.

The locking ribs 456 are configured to create a snap fit with the locking recess 448f (FIG. 24). Thus, the removable receptacle 430 can be inserted with the lower end 433 inserted through the aperture 448e (FIG. 23). Then, the locking hooks 455 can be aligned with the locking apertures 448d and the receptacle 430 can be pushed until the struts 454 reached the upper surface of the support flange 448. Thereafter, the receptacle 430 can be rotated (in the clockwise direction as viewed in FIGS. 23 and 27) until the locking ridges 456 engage with the locking recesses 448f. As such, the receptacle 430 can be securely held in place on the flange 448 for use.

FIGS. 32-36 illustrate a modification of the removable cartridge receptacle 430, identified generally by the reference numeral 530.

The receptacle 530 can be configured to receive another cartridge, for example, a cartridge 560 (FIG. 37) that is larger than the cartridge 460.

For example, the sidewall 532 of the receptacle 530 can have a larger inner diameter, so as to receive the cartridge 560, which has a larger outer diameter than the cartridge 460. In this configuration, the support struts 554 are generally shorter but can include locking hooks 556 that are the same size and mounted in the same position as the locking hooks 456 for engagement with the locking recesses 448d, as described above. Similarly, the receptacle 530 can include a piercing assembly 538 and ridge 536 configured to interact with ridges 566 and 567 on the cartridge 560.

Optionally, the beverage mixing and dispensing assembly 400 can include both the lid assemblies 470 and 170, the retainer 472, removable receptacle members 530, 430, for use with a variety of sizes of cartridges such as the cartridges 460 and 560, and adapter 410. As noted above, the lid 170 can include various other drink-through devices such as chug nozzles, drink-through valves, flip up nozzles, straws, etc. (not shown). The retainer plate 472 can optionally be used with either the lid 170 or the lid assembly 470.

With reference to FIGS. 38-40, any of the cartridges described above 160, 260, 460, 560 can be packaged in a sterile manner with a sterilized and sealed wrapper 700. The wrapper can be made from a material that is frangible, for example, tearable without the need for tools, for example, using only a user's hands. For example, the wrapper 700 can be large enough to completely encase any cartridge disposed therein, in a sealed and sterile state. In the illustrated embodiment, the wrapper 700 is formed of a tubular sheet material, extending along a longitudinal axis 710. The cartridge 160 is inserted into the tubular material, then sealed, for example but without limitation, with heat sealing at first end 701 and second end 703.

The wrapper 700 can also include a notch 702 or other feature for preferential tearing. As such, a user can grasp the wrapper 700 and the cartridge therein from one end of the wrapper 700, for example, by pinching between fingers 704, 706. Optionally, the wrapper 700 can include an indicia 708 indicating which end of the wrapper 700 corresponds to the top 161 of the cartridge. With the user's fingers 704, 706 grasping the top 161 of the cartridge 160 the user can use their other hand to tear the wrapper 700 beginning at the notch 702.

As shown in FIG. 39, the wrapper 700 has been torn and as shown in FIG. 40, the torn off piece of wrapper 700 has been removed, exposing the lower end 163 of the cartridge 160. While the user maintains their grip on the remaining portion of the wrapper 700 and the cartridge 160, they can insert the lower end 163 of the cartridge into the adapter 110, thereby reducing the likelihood of contamination of the outer surface of the cartridge 160, during use. This is particularly advantageous because in the designs described above, the mixed beverage flows over and around and into contact with outer surfaces of the cartridge 160 during use. Thusly allowing a user to carry one or more cartridges 160 in a sterilized state, then remove the sterilized wrapping without the need to touch the outer surfaces of cartridge 160, thereby reducing the likelihood of contamination. Some users would find this particularly advantageous for mixing beverages such as baby formula.

FIGS. 41-43 illustrate a modification of the wrapper 700, identified generally by the reference 800. In this embodiment, the notch 802 is formed on the first end 801. Thus, in use, a user can hold the cartridge 160 using the user's fingers 704, 706 on one hand, then grasp a piece of the first end 801 with the users other fingers 705, and tear the wrapper 800 longitudinally, as shown in FIG. 42. Then, the user can continue to pull the wrapper around the sealed end of the cartridge 160, so that the sealed end of the cartridge 160 can be inserted into a receptacle, such as receptacle 130 (FIG. 3), while the user maintains a grip on the cartridge 160, with a portion of the wrapper 800, thereby maintaining cleanliness of the cartridge 160.

FIGS. 44-46 illustrate yet another modification of the wrapper 700, identified generally by the reference numeral 900. In this embodiment, the longitudinal axis 910 of the tubular material forming the wrapper 900 extends vertically (as viewed in FIG. 44) and transverse to the longitudinal axis of the cartridge 160. The indicia 908 indicates to the user on which side of the wrapper 900 the top end of the cartridge 160 is positioned.

In this embodiment, the cartridge can be placed inside the tubular material forming the wrapper 900 and the first and second ends 901, 903 can be heat sealed to contain the cartridge 160 within the wrapper 900. Additionally, the notch 902 can be provided along the first end 901. This can be an advantage in that is there is a manufacturing convenience in providing the notch 902 on one of the heat sealed ends 901, 903.

In use, a user can grasp the top end of the cartridge 160 with their fingers 704, 706 then grab the portion of the wrapper 900 adjacent the sealed end of the cartridge 160 with fingers 705, then proceed to tear the wrapper 900 using the notch 902 as a starting point. As shown in FIG. 45, the portion of the wrapper adjacent the sealed end of the cartridge 160 can be cleaved away from the remainder of the wrapper 900 and then fully removed in FIG. 46, thereby allowing a user to maintain their grasp on the cartridge 160 with the remaining portion of the wrapper 900 and then insert the cartridge 160 into a receptacle, such as the receptacle 130 (FIG. 3).

Those skilled in the art will appreciate that many variations and modifications can be made to the embodiments described above without departing from the spirit and scope of the present inventions.

What is claimed is:

1. A beverage mixing and dispensing assembly kit, comprising:
   a liquid container having a reservoir portion and an upper mouth portion, the upper mouth portion comprising an external threaded portion configured for threaded engagement;
   at least a first beverage ingredient cartridge having a first cartridge housing with a first top end potion that is closed, a first lower end with a first opening defining a first ingredient discharge passage, a first frangible seal member sealed over the first ingredient discharge passage, and a first beverage ingredient contained within the first cartridge housing by the first frangible seal member;
   at least a second beverage ingredient cartridge having a second cartridge housing with a second top end portion that is closed, a second lower end with a second opening defining a second ingredient discharge passage, a second frangible seal member sealed over the second ingredient discharge passage, and a second beverage ingredient contained within the second cartridge housing by the second frangible seal member;
   an adapter member comprising:
   a lower end portion having adapter internal threads configured to engage with the external threaded portion of the liquid container;
   an upper mouth portion having adapter external threads;
   a first removable beverage ingredient cartridge receptacle portion, the first removable beverage ingredient cartridge receptacle portion comprising a first receptacle wall portion sized to receive the first cartridge housing, a first upper end with a plurality of first struts extending from the first upper end and each having a first hook portion, and a first piercing member configured to pierce the first frangible seal member when the first beverage ingredient cartridge is inserted into the first removable beverage ingredient cartridge receptacle portion, in use;
   a second removable beverage ingredient cartridge receptacle portion, the second removable beverage ingredient cartridge receptacle portion comprising a second receptacle wall portion sized to receive the second cartridge housing, a second upper end with a plurality of second struts extending from the second upper end and each having a second hook portion, and a second piercing member configured to pierce the second frangible seal member when the second beverage ingredient cartridge is inserted into the second removable beverage ingredient cartridge receptacle portion, in use; and
   a mounting flange configured to releasably connect with the first and second removable beverage ingredient cartridge receptacle portions, the mounting flange comprising at least a plurality of locking apertures configured to receive the first and second hook portions and at least a plurality of liquid flow passages configured to allow liquid to flow from the lower end portion, through the plurality of liquid flow passages and out through the upper mouth portion;
   a lid member configured to engage the upper mouth portion of the adapter member; and
   a retainer member disposed between the adapter member and the lid member and configured to retain the first beverage ingredient cartridge in the first removable beverage ingredient cartridge receptacle portion and to retain the second beverage ingredient cartridge in the second removable beverage ingredient cartridge receptacle portion, in use, the retainer member comprising a peripheral portion, a cartridge blocking portion, and a fluid passage portion disposed between the peripheral portion and the cartridge blocking portion, the peripheral portion being sized to fit between and be secured in place by the adapter member and the lid member, the cartridge blocking portion being without any apertures large enough for either of the first or second beverage ingredient cartridge to pass through, the fluid passage portion comprising one or more apertures configured to allow a mixed beverage from the liquid container to pass therethrough.

2. The beverage mixing and dispensing assembly kit of claim 1, wherein the lid member comprises a ring member and a baby bottle nipple.

3. The beverage mixing and dispensing assembly kit of claim 1, wherein the lid member comprises a closeable drinking port.

4. The beverage mixing and dispensing assembly kit of claim 1, wherein the first beverage ingredient cartridge is sealed in a sterile wrapper, the sterile wrapper comprising a first longitudinal end and a second longitudinal end, the first top end portion of the first beverage ingredient cartridge being positioned at the first longitudinal end of the sterile wrapper, an exterior surface of the first longitudinal end of the sterile wrapper comprising an indicia indicating a position of the first top end portion of the first beverage ingredient cartridge, the sterile wrapper comprising a notch disposed between the first and second longitudinal ends, the notch being configured to facilitate tearing of the sterile wrapper along a tearing direction transverse to a longitudinal direction of the sterile wrapper.

5. A beverage mixing and dispensing assembly kit, comprising:
- a liquid container having a reservoir portion and an upper mouth portion, the upper mouth portion comprising an external threaded portion configured for threaded engagement;
- a first beverage ingredient cartridge having a first cartridge housing with a first top end portion that is closed, a first lower end with a first opening defining a first ingredient discharge passage, a first frangible seal member sealed over the first ingredient discharge passage, and a first beverage ingredient contained within the first cartridge housing by the first frangible seal member;
- an adapter member comprising:
- a lower end portion having adapter internal threads configured to engage with the external threaded portion of the liquid container;
- an upper mouth portion having adapter external threads;
- a first removable beverage ingredient cartridge receptacle portion, the first removable beverage ingredient cartridge receptacle portion comprising a first receptacle wall portion sized to receive the first cartridge housing, and a first piercing member configured to pierce the first frangible seal member when the first beverage ingredient cartridge is inserted into the first removable beverage ingredient cartridge receptacle portion, in use;
- a mounting flange configured to releasably connect with the first removable beverage ingredient cartridge receptacle portion, the mounting flange comprising at least a plurality of liquid flow passages configured to allow liquid to flow from the lower end portion, through the plurality of liquid flow passages and out through the upper mouth portion;
- a lid member configured to engage the upper mouth portion of the adapter member; and
- a retainer member disposed between the adapter member and the lid member and configured to retain the first beverage ingredient cartridge in the first removable beverage ingredient cartridge receptacle portion, in use, the retainer member comprising a peripheral portion, a cartridge blocking portion, and a fluid passage portion disposed between the peripheral portion and the cartridge blocking portion, the peripheral portion being sized to fit between and be secured in place by the adapter member and the lid member, the cartridge blocking portion being without any apertures large enough for the first beverage ingredient cartridge to pass through, the fluid passage portion comprising one or more apertures configured to allow a mixed beverage from the liquid container to pass therethrough.

6. The beverage mixing and dispensing assembly kit of claim 5, wherein the first beverage ingredient cartridge is sealed in a sterile wrapper, the sterile wrapper comprising a first longitudinal end and a second longitudinal end, the first top end portion of the first beverage ingredient cartridge being positioned at the first longitudinal end of the sterile wrapper, an exterior surface of the first longitudinal end of the sterile wrapper comprising an indicia indicating a position of the first top end portion of the first beverage ingredient cartridge, the sterile wrapper comprising a notch disposed between the first and second longitudinal ends, the notch being configured to facilitate tearing of the sterile wrapper along a tearing direction transverse to a longitudinal direction of the sterile wrapper.

7. The beverage mixing and dispensing assembly kit of claim 5, additionally comprising a second removable beverage ingredient cartridge receptacle portion, the second removable beverage ingredient cartridge receptacle portion comprising a second receptacle wall portion sized to receive a second cartridge housing, a second upper end with a plurality of second struts extending from the second upper end and each having a second hook portion, and a second piercing member configured to pierce a second frangible seal member when a second beverage ingredient cartridge is inserted into the second removable beverage ingredient cartridge receptacle portion, in use.

8. The beverage mixing and dispensing assembly kit of claim 7, additionally comprising the second beverage ingredient cartridge having a second cartridge housing with a second top end portion that is closed, a second lower end with an second opening defining a second ingredient discharge passage, the second frangible seal member sealed over the second ingredient discharge passage, and a second beverage ingredient contained within the second cartridge housing by the second frangible seal member.

9. The beverage mixing and dispensing assembly kit of claim 5, wherein the first removable beverage ingredient cartridge receptacle portion comprises a first upper end with a plurality of first struts extending from the first upper end and each having a first hook portion, and wherein the mounting flange comprises at least a plurality of locking apertures configured to receive each first hook portion.

10. The beverage mixing and dispensing assembly kit of claim 5, wherein the lid member comprises a ring member and a baby bottle nipple.

11. The beverage mixing and dispensing assembly kit of claim 5, wherein the lid member comprises a closeable drinking port.

* * * * *

UNITED STATES PATENT AND TRADEMARK OFFICE
CERTIFICATE OF CORRECTION

PATENT NO. : 12,496,257 B2  
APPLICATION NO. : 18/693402  
DATED : December 16, 2025  
INVENTOR(S) : Daniel Howard Page 1 of 1

It is certified that error appears in the above-identified patent and that said Letters Patent is hereby corrected as shown below:

In the Claims

In Column 17, Claim 1, Line 46, delete "end potion that" and insert --end portion that--.

Signed and Sealed this  
Third Day of February, 2026

John A. Squires  
*Director of the United States Patent and Trademark Office*